United States Patent Office 3,044,899
Patented July 17, 1962

3,044,899
METHOD OF COATING METALS WITH THERMO-
PLASTIC MATERIALS
Peter J. Canterino, Bartlesville, Okla., assignor to Phillips
Petroleum Company, a corporation of Delaware
No Drawing. Filed Feb. 16, 1959, Ser. No. 793,291
15 Claims. (Cl. 117—132)

This invention relates to a new and useful method for applying thermoplastic coatings to metal surfaces. In one aspect, the invention relates to a method of applying a coating to a metal surface utilizing a dispersion of a solid polymer of an olefin in a solution of a polymer compatible with said olefin polymer, said dissolved polymer, containing polar groups.

The chemical resistance, low electrical conductivity, smooth surface and attractive appearance of olefin polymers make them desirable materials for coating of metal surfaces such as, for example, metal furniture, structural members, refrigerator bodies, laundry equipment, etc. Application of such coatings to metal surfaces, however, presents a number of problems. For example, many polymers of olefins are insoluble in liquids commonly employed as solvents at ordinary temperatures, thus rendering their application from solution impractical unless special methods are used. Furthermore, adhesion of these polymers to metal is frequently poor, leading to blistering, corrosion under the coating, and other undesirable effects.

It is an object of this invention to provide an improved method for coating metal surfaces with thermoplastic materials.

Another object of this invention is to provide an improved method for coating metal surfaces with a thermoplastic composition containing a solid olefin polymer.

Still another object of this invention is to provide an improved method for coating metal surfaces with a composition comprising polyethylene and chlorinated polyethylene.

These and other objects of the invention will become more readily apparent from the following detailed description and discussion.

The foregoing objects are realized broadly by applying a dispersion of finely divided solid polymer of an olefin in a solution of polymer compatible therewith, said dissolved polymer containing polar groups, to a metal surface. Following application of the dispersion the coating is dried to remove solvent, at a temperature below the boiling point of the solvent and also below the dissolution temperature of the olefin polymer. The third step of the process comprises heating the coating at a temperature above the melting point of the polymers for a period of time sufficient to form an impervious coating adherent to said metal surface.

A simplified flow diagram of the process is as follows:

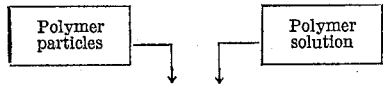

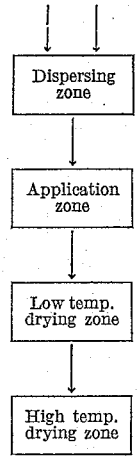

In carrying out the invention, a solution of a polar group-containing polymer is prepared by combining a suitable solvent and said polymer. While the solution can be prepared at room temperature, it is generally desirable to heat the solvent, for example, to about 120 to 200° F. and add the polymer thereto with agitation. Depending upon the particular polymer employed, and the type of coating desired, the concentration of the polymer solution can vary over a relatively wide range. Usually, however, the solution contains between about 1 and about 10 percent by weight of polymer, and preferably between about 2 and about 7 percent. The solvents which are employed in the preparation of the polymer solution can be aromatic or chlorinated hydrocarbons which are readily volatilized at temperature below the softening point of the polar group-containing polymer and also the other polymer component of the coating composition. Typical solvents which can be used include benzene, toluene, xylene, carbon tetrachloride, dichlorethane, and the like. The polar group-containing polymers are preferably hydrocarbon polymers having a molecular weight in excess of about 1000 substituted with various groups such as halogen, hydroxyl, carboxyl, etc. The number of substituent polar groups can vary widely, however, more usually, it will be between about 2 and about 30 groups per 100 carbon atoms. The preferred polar group-containing polymer is chlorinated polyethylene, usually containing from 5 to about 45 percent by weight of chlorine. Other suitable polar group containing polymers include chlorosulfonated polyethylene, hydroxylated polymers, such as hydrolyzed ethylene-vinyl acetate copolymers, halogenated natural and synthetic rubbers, butadiene acrylic acid copolymers, and the like. It is essential that the polar group-containing polymer be compatible with the polyethylene used.

After dissolution of the polar group-containing polymer the polymer solution is preferably cooled, for example, to room temperature, and finely subdivided solid olefin polymer is added thereto, the mixture then being stirred until a uniform dispersion or slurry is obtained. The olefin polymers which can be employed include solid polymers and copolymers of aliphatic monoolefins like ethylene, propylene (especially isotactic polypropylene), butene, etc.; polymers of aryl-substituted olefins, such as styrene, various alkyl styrenes, such as methylstyrene, ethylstyrene, etc.; also copolymers of monoolefins with a minor amount of diolefins, such as butadiene, isoprene, etc. The invention is particularly applicable to polymers of olefins having a maximum of 6 carbon atoms per molecule and no branching nearer the double bond than the 4-position and more particularly polyethylene. The following discussion will be directed to the use of polyethylene, however, this is not to be taken in any limiting sense, and it is within the scope of the invention to utilize any of the above polymers in carrying out the invention.

The polyethylene used in carrying out the invention preferably is one having an inherent viscosity in the range of between about 0.3 and about 4.0. However, materials of higher viscosity can also be employed. The polyethylene can be prepared by any of the methods which are usually employed for the prepartion of these polymers. One method of preparing polymers of olefins is described in detail in Hogan et al., Patent No. 2,825,721. This particular method utilizes a chromium oxide catalyst, preferably containing hexavalent chromium associated with a material selected from the group consisting of silica, alumina, zirconia and thoria, and composites thereof. In the method of Hogan et al., olefins are polymerized in the presence of a hydrocarbon diluent, for example, an acyclic, alicyclic or aromatic compound which is inert. The reaction is ordinarily carried out at a temperature of between about 150° F. and about 450° F. and under a pressure sufficient to maintain the reactant and diluent in the liquid state. The polyethylene prepared by this method is characterized by having an unsaturation which is principally either trans-internal or terminal vinyl, depending on the particular process conditions employed. The polyethylene prepared by this method is also characterized by its high density and high percentage of crystallinity at normal atmospheric temperatures.

The polymers which are produced in accordance with the foregoing discussion comprise both polymers which are soluble and polymers which are insoluble in the polymerization reaction effluent. By appropriately controlling the polymerization reaction temperature, generally below 230° F., it is possible to produce increased yields of polyethylene which is insoluble in the diluent and is produced in particle form. This polymer is formed in association with polymerization catalyst and is non-tacky, non-agglutinative and suspended in the liquid diluent. Polyethylene can also be prepared in the presence of organo-metallic compounds, such as triethylaluminum plus titanium tetrachloride, mixtures of ethyl aluminum halides with titanium tetrachloride and the like. Another group of catalysts which is used in the preparation of polyethylene comprise a halide of group IV metal, such as for example, titanium tetrachloride, zirconium tetrachloride, tin tetrabromide, etc., with one or more free metals selected from the group consisting of sodium, potassium, lithium, rubidium, zinc, cadmium and aluminum.

In addition to the foregoing, the invention also includes within its scope the use of polyethylenes prepared by the conventional high pressure methods and other methods which are well known in the art.

While the invention is applicable generally to polyethylene prepared by any of the known methods, it finds particular application in the use of high density, highly crystalline polyethylenes, namely, polyethylene having a density of at least 0.940 and preferably 0.960 or higher and crystallinity of at least 70 percent and preferably at least 80 percent at normal atmospheric temperatures as measured by nuclear magnetic resonance, prepared by the method and utilizing the catalyst set forth in Hogan et al.

The amount of polyethylene added to the polymer solution usually is in the range of between about 10 and about 100 parts by weight per 100 parts by weight of said solution. The polyethylene prior to use should be subdivided to a particle size of about 20 mesh or less and preferably below about 50 mesh.

After the finely divided polyethylene is added, the mixture is stirred until a uniform dispersion or slurry is obtained, after which it is applied to the metal surface. Application of the coating composition can be made by spraying, brushing, roller coating, or by any other suitable method known in the art. After the coating has been applied, solvent is removed therefrom by allowing the coated article to stand at room temperature for a time or by heating, preferably in a vacuum. It is important that solvent removal be effected at a rate such that void formation does not occur, that is, below the boiling point of the solvent and also at a sufficient low temperature that substantially all of the polyethylene remains undissolved. When the coating is substantially solvent free, the article is heated above the melting point of the polymer components, generally in the range of between about 300 and about 500° F. for a period of time sufficient to form an impervious coating which is strongly adherent to the metal. The time of heating usually is between about 1 and about 10 minutes, however, longer periods of heating can be employed, if desired. Usually only one application is necessary to provide a suitable coating, however, additional coatings can be applied if necessary, to obtain a greater thickness.

Any of the ordinary commercial metals or metal articles can be coated in the method of this invention. Specific metals to which the coating can be applied include various steels, aluminum, brass, copper and the like. When desired, pigments can be added to the coating composition to provide color in the finished articles. Carbon black, titanium dioxide, etc., are suitable materials for this purpose. It is also within the scope of the invention to incorporate a curing or vulcanizing agent in the coating to provide cross-linking or curing of the polymer during the final heating operation. The various organic peroxides, including materials such as benzoyl peroxide, dicumyl peroxide, etc., are particularly suitable for this purpose.

The following examples are presented in illustration of the invention. The polyethylene employed in the examples includes a conventional polyethylene sold by Union Carbide and Carbon Corporation, designated as DYNH polyethylene, and linear high density, high crystallinity polyethylene prepared in accordance with the method of Hogan et al.

Polyethylene (A) was prepared by polymerizing ethylene over a chromium oxide-silica-alumina catalyst at a temperature of approximately 280° F. and a pressure of about 420 p.s.i., using a cyclohexane solvent. This material had 0.01 percent of ash and a melt index of 0.43 (molecular weight 46,000).

Polyethylene (B) was prepared by grinding an ethylene polymer fluff prepared over chromium oxide-silica-alumina catalyst. This material had the following properties:

| | |
|---|---|
| Volatiles, percent [1] | 6.0 |
| Ash, percent [2] | 0.008 |
| Melt index [3] | 0.7 |
| Inherent viscosity [4] | 1.8 |
| Tensile, p.s.i., injection molded [5] | 4880 |
| Tensile, p.s.i., compression molded [5] | 4350 |
| Elongation, percent, injection molded [6] | 25 |
| Elongation, percent, compression molded [6] | 23 |
| Impact, Izod (ft.-lb./inch notch) [7] | 4.2 |
| Heat distortion temperature, °F. [8] | 181 |
| Crystalline freeze point, °F. [9] | 253 |
| Stiffness, p.s.i. [10] | 149,000 |
| Density, gm./cc. [11] | 0.960 |
| Ionol content, percent | 0.03 |

[1] Determined by placing approximately 20 grams of finely ground (less than 20 mesh) sample in each of two carefully dried 100-ml. beakers, weighing the beaker before and after adding the sample. A piece of tissue was placed over the top of each beaker, this tissue being held in place by a rubber band. The beakers were then placed in a vacuum oven and dried at 170±2° F. for 16 hours under a vacuum of 29–30 inches of mercury. The vacuum was then released and the beakers cooled to room temperature in a desiccator. The tissue covers and rubber bands were then removed and the beakers again weighed and the loss and percentage loss calculated.
[2] Determined by placing 9–10 g. of sample in each of two Number 2 porcelain crucibles which had been previously reduced to constant weight by heating in an electric furnace at 1200° F. The crucibles were then heated over a Meeker burner to burn the samples, heat being regulated to prevent spattering. When the burning was essentially complete, the crucibles were transferred to an electric furnace and heated at 1200° F. for two hours, after which they were transferred to a desiccator and allowed to cool to room temperature. Crucibles were then weighed and the amount and percentage of ash calculated, the average from the two determinations being recorded.
[3] ASTM D-1238-52T: Modified by taking 5 samples at 2 minute intervals, averaging the 5 values (weights), discarding any values which deviate from the average by more than 5% (by weight), reaveraging and multiplying by 5 to obtain the amount of polymer extruded in 10 minutes.
[4] By the method of Kemp et al., Ind. and Eng. Chem. 35, 1108 (1943).
[5] ASTM D-638.
[6] ASTM D-638.
[7] ASTM D-256.
[8] ASTM D-648.
[9] Carried out by melting a sample of the polymer, inserting a thermocouple into the molten polymer and allowing the molten polymer to cool slowly. The temperature is recorded and is plotted on a chart versus time. The crystalline freeze point is the first plateau in the time-versus-temperature curve.
[10] ASTM D-747.
[11] Determined by placing a pea-sized specimen cut from a compression molded slab of the polymer in a 50-ml. glass-stoppered graduate. Carbon tetrachloride and methyl cyclohexane were added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F. the balance is adjusted until the pointer is at zero. The value shown on the scale is taken as the specific gravity.

*Example I*

Chlorination of DYNH polyethylene was effected by charging 200 grams of the polymer and 3.5 liters of carbon tetrachloride to a 5 liter flask, heating at 140° F. until the polyethylene was dissolved and adding chlorine while irradiating with a 100 watt Hanovia ultraviolet lamp, maintaining the temperature at 140° F. After 35 grams of chlorine had been added (about 30 minutes), the solution was poured into about double its volume of isopropyl alcohol. The polymer was recovered on a filter, washed with isopropyl alcohol and dried in a vacuum oven at 122° F. for 12 hours. Chlorine content of the dry polymer was 8.8 percent.

Ten grams of chlorinated polyethylene so prepared was dissolved in 450 milliliters of toluene at about 176° F. When the chlorinated polyethylene had dissolved, the solution was cooled to room temperature and 90 grams of powdered (90 percent finer than 100 mesh) polyethylene (A) prepared by the method of Hogan and Banks, as set forth above, was added. The system was stirred until a uniform dispersion was obtained. Aluminum strips were dipped in this dispersion, dried in a vacuum oven at 140° F. for 10 minutes. They were then transferred to a high temperature oven and baked for 3 minutes at 400° F. The strips were allowed to cool and the coating procedure repeated. Coated strips were tested for pin holes with a Tesla coil. No defects were found.

One of the coated strips was immersed in carbon tetrachloride for 16 hours at room temperature. When removed and dried, the coating remained firm on the metal and no deterioration was detectable.

*Example II*

To a 5 gallon reactor was charged 2.1 pounds of polyethylene (B) prepared in accordance with the method of Hogan et al., as set forth above in 55 pounds of carbon tetrachloride. The reactor was sealed and the temperature elevated to 210° F. with agitation. Chlorination of the resulting solution was effected by passing in 2.05 pounds of chlorine in the presence of a 4 watt fluorescent lamp within a period of 3 hours, the temperature being maintained at about 210° F. Hydrogen chloride was then vented from the system and the polymer precipitated by passing the solution into methanol, recovered therefrom and dried in a vacuum oven at 190° F. for 16 hours. The chlorine content of the polymer was 30.3 percent.

Ten grams of the chlorinated polymer prepared as above was dissolved in 200 grams of toluene at about 176° F. The solution was cooled to room temperature and 90 grams of powdered (90 percent finer than 100 mesh) polyethylene (B) was added thereto. A uniform dispersion was obtained by stirring. Aluminum strips were dipped in the solution and placed in a rack to dry at room temperature. When substantially solvent free, the strips were baked at 400° F. for 5 minutes. Tests with a Tesla coil showed no pin holes in the coating.

It is apparent that by following the procedure of the above examples, there is obtained a metal having an impervious coating of a polymeric material containing polyethylene which is strongly adherent to the metal.

Having thus described the invention by providing specific examples thereof, it is to be understood that no undue limitations or restrictions are to be drawn by reason thereof and that many variations and modifications are within the scope of the invention.

I claim:

1. A method for preparing a coated metal surface which comprises applying to said surface a coating of a dispersion of finely sub-divided solid olefin polymer in a solution of polymer compatible therewith, said dissolved polymer containing polar groups, drying said coating at a temperature below the boiling point of the solvent and without substantial dissolution of the olefin polymer and thereafter heating said coating at a temperature above the melting point of the polymers for a period of time sufficient to form an impervious coating adherent to said metal surface.

2. The process of claim 1 in which the metal is aluminum.

3. The process of claim 2 in which the polar group containing polymer in chlorinated polyethylene.

4. The process of claim 3 in which the solvent is toluene.

5. The process of claim 1 in which the olefin polymer is polyethylene.

6. A method for preparing a coated metal surface which comprises applying a coating of a dispersion of finely sub-divided polyethylene in a solution of chlorinated polyethylene, drying said coating at a temperature below the boiling point of the solvent and without substantial dissolution of the polyethylene and thereafter heating said coating at a temperature above the melting point of the polymers for a period of time sufficient to form an impervious coating adherent to said metal surface.

7. The method for preparing a coated metal surface which comprises applying a coating of a dispersion of from 10 to 100 parts by weight per 100 parts of solution of finely sub-divided polyethylene in a toluene solution of chlorinated polyethylene, said solution containing between about 1 and about 10 percent by weight of chlorinated polyethylene, drying said coating at a temperature from about 120 to 200° F., and thereafter heating said coating at a temperature of between about 300 and about 500° F. at from 1 to 10 minutes to provide an impervious coating adherent to said metal surface.

8. A method of claim 7 in which the polyethylene has a density of at least 0.94 and a crystallinity of at least 70 percent at normal room temperature.

9. A method for preparing a coated aluminum metal surface which comprises applying a coating of a dispersion of finely sub-divided polyethylene having a density of at least 0.94 and a crystallinity of at least 70 percent at normal atmospheric temperature in a solution of chlorinated polyethylene, drying said coating at a temperature between about 120 and about 200° F. and thereafter heating said coating at a temperature in the range of about 300 to about 500° F. for a period of about 1 to 10 minutes to form an impervious coating adherent to said metal surface.

10. A method for preparing a coating metal surface which comprises applying to a said surface a coating of a dispersion of from 10 to 100 parts by weight per 100 parts of solution of finely sub-divided polyethylene having a density of at least 0.94 and a crystallinity of at least 70 percent at normal room temperature in a solution of chlorinated polyethylene, said solution containing between about 1 and about 10 percent by weight of said chlorinated polyethylene, drying said coating at a temperature at between about 120 and about 200° F. and thereafter heating said coating at a temperature in the range of about 300 to about 500° F. for between about 1 and about 10 minutes to form an impervious coating adherent to said metal surface.

11. A method for preparing the coated metal surface which comprises dissolving in a solvent a polymer compatible with a solid olefin polymer, said dissolved polymer containing polar groups, adding to said solution finely sub-divided solid olefin polymer, agitating said mixture to form a uniform dispersion, applying a coating of said dispersion to said surface, drying said coating at a temperature below the boiling point of the solvent and without substantial dissolution of the olefin polymer and thereafter heating said coating at a temperature above the melting point of the polymers for a period of time sufficient to form an impervious coating adherent to said metal surface.

12. The process of claim 11 in which the olefin polymer is polyethylene.

13. A method for preparing a coated metal surface which comprises dissolving in a solvent a polymer compatible with polyethylene, said polymer containing polar groups, adding finely sub-divided polyethylene to said solution, stirring the mixture to form a uniform dispersion, applying a coating of said dispersion to said surface, drying said coating at a temperature in the range of between about 120 and about 200° F., and thereafter heating said coating at a temperature in the range of about 300 to about 500° F. for between about 1 and about 10 minutes to form an impervious coating adherent to said metal surface.

14. A method for preparing a coated metal surface which comprises dissolving in a solvent between about 1 and about 10 percent by weight of a polymer compatible with polyethylene, said polymer containing polar groups, adding to said solution between about 10 and about 100 parts of solution of finely sub-divided polyethylene, agitating said mixture to form a uniform dispersion, applying a coating of said dispersion to said metal surface, drying said coating at a temperature in the range of between about 120 and about 200° F. and thereafter heating said coating at a temperature in the range of about 300 to about 500° F. for between about 1 and about 10 minutes to form an impervious coating adherent to said surface.

15. A method for preparing a coated aluminum metal surface which comprises dissolving between about 1 and about 10 percent by weight of chlorinated polyethylene in toluene at an elevated temperature, reducing the temperature of the solution to room temperature, adding to said solution between about 10 and about 100 parts per 100 parts of solution of finely subdivided polyethylene having a density of at least 0.94 and a crystallinity of at least 70 percent at normal room temperature, agitating said mixture to form a uniform dispersion applying a coating of said dispersion to said metal surface, drying said coating at a temperature of between about 120 and about 200° F., and thereafter heating said coating at a temperature in the range of between about 300 and about 500° F. for between about 1 and about 10 minutes to form an impervious coating adherent to said metal surface.

References Cited in the file of this patent

UNITED STATES PATENTS

| | | |
|---|---|---|
| 2,628,208 | Loukomsky | Feb. 10, 1953 |
| 2,630,398 | Brooks et al. | Mar. 3, 1953 |
| 2,844,555 | Passino et al. | July 22, 1958 |
| 2,844,557 | Welch | July 22, 1958 |
| 2,854,425 | Boger et al. | Sept. 30, 1958 |
| 2,876,206 | Green | Mar. 3, 1959 |
| 2,888,364 | Bauer | May 26, 1959 |
| 2,925,354 | Berardinelli | Feb. 16, 1960 |
| 2,930,106 | Wrotnowski | Mar. 29, 1960 |

UNITED STATES PATENT OFFICE
CERTIFICATE OF CORRECTION

Patent No. 3,044,899                                            July 17, 1962

Peter J. Canterino

It is hereby certified that error appears in the above numbered patent requiring correction and that the said Letters Patent should read as corrected below:

Column 6, line 60, for "in" read -- is --.

Signed and sealed this 11th day of December 1962.

(SEAL)
Attest:

ERNEST W. SWIDER                                          DAVID L. LADD
Attesting Officer                                             Commissioner of Patents